United States Patent [19]

Riggi

[11] Patent Number: 4,649,865
[45] Date of Patent: Mar. 17, 1987

[54] BIRD FEEDER

[76] Inventor: Michael S. Riggi, 39 Parkhaven Dr., Tonawanda, N.Y. 14150

[21] Appl. No.: 835,175

[22] Filed: Mar. 3, 1986

[51] Int. Cl.$^4$ .............................................. A01K 39/01
[52] U.S. Cl. ..................................... 119/51 R; 119/63
[58] Field of Search ...................... 119/51 R, 63, 52 R

[56] References Cited

U.S. PATENT DOCUMENTS

| | | | |
|---|---|---|---|
| 2,230,058 | 1/1941 | Hornung | 119/52 R |
| 2,918,901 | 12/1959 | Poulsen | 119/51 R |
| 3,104,649 | 9/1963 | Slaven | 119/51 R |
| 3,164,130 | 1/1965 | Curtis et al. | 119/51 R |
| 3,241,525 | 3/1966 | Meier | 119/55 |
| 4,207,839 | 6/1980 | Barry | 119/51 R |

Primary Examiner—Hugh R. Chamblee
Attorney, Agent, or Firm—Bean, Kauffman & Bean

[57] ABSTRACT

A bird feeder having a feed reservoir provided with a feed access opening, a perch, a roof for covering the reservoir, a roof extension hingedly mounted on the roof and biased to normally extend in a coplanar relationship therewith, so as to overlie the access opening and an auxiliary perch fixed to depend from the roof extension, wherein the roof extension is movable to cover the access opening and the auxiliary perch is moved into a position below the perch in response to the application to the auxiliary perch of the weight of an animal or bird above a desired weight.

7 Claims, 2 Drawing Figures

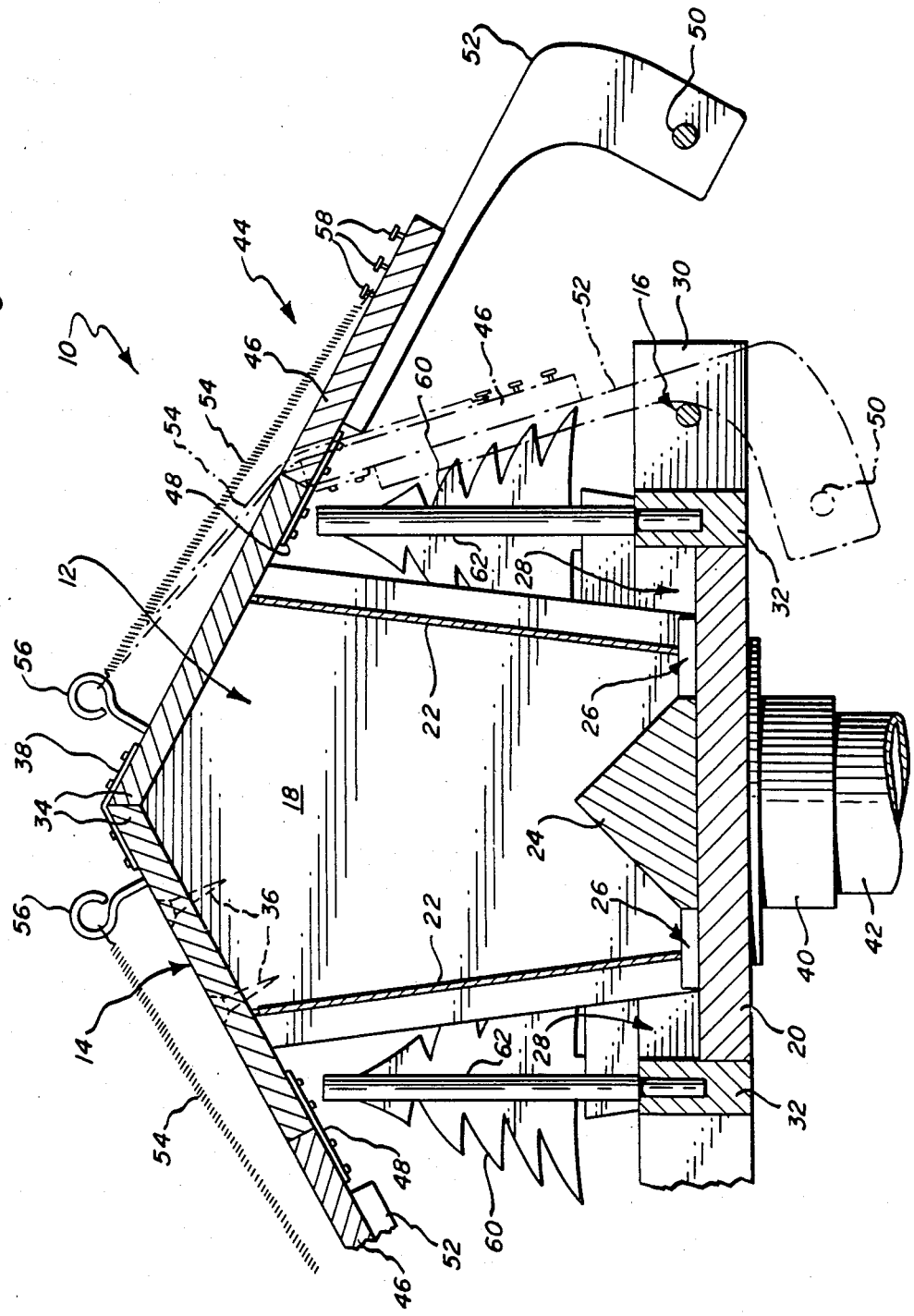

BIRD FEEDER

BACKGROUND OF THE INVENTION

The invention relates to bird feeders made accessible only to birds below a desired weight.

Heretofore, various attempts have been made to provide bird feeders with weight responsive devices intended to discourage animals, such as squirrels, and large birds from attempting to gain access to feed intended exclusively for small birds. As by way of example, reference may be had to U.S. Pat. Nos. 2,230,058; 2,918,901; 3,104,649, 3,164,130; 3,241,525 and 4,407,839.

While the constructions disclosed by these prior patents appear capable of performing their intended purpose, they are believed to have the disadvantage of being overly complex or cumbersome to manufacture and maintain.

SUMMARY OF THE INVENTION

It is an object of the present invention to provide a bird feeder with weight responsive means adapted to discourage or prevent access to the bird feeder by animals or birds above a desired weight.

It is a further object of the present invention to provide a bird feeder in which only a single spring biased movable part is required to control access to each food access opening of a bird feeder, wherein such part is carried by the roof of the feeder in a manner providing for an attractive overall appearance.

A still further object is to provide a bird feeder with oppositely facing feed access openings, which may be independently closed in response to the presence thereat of an animal or bird above a desired weight.

In a preferred form of the invention, a bird feeder comprises a feed reservoir including at least one feed access opening, a perch arranged adjacent the access opening, a roof for covering the reservoir, a roof extension hingedly attached adjacent an edge of the roof at a point above the access opening, an auxiliary perch depending from the roof extension and means for biasing the roof extension to normally assume a first position, wherein the roof extension is generally coplanar with an adjacent portion of the roof to which same is attached and the auxiliary perch is disposed in a parallel and horizontally outwardly spaced relationship to the perch. The roof extension and the auxiliary perch are movable against the bias to a second or feed access opening blocking position upon the application of a predetermined weight to the auxiliary perch or extension, wherein the latter effectively blocks access or the access opening and the auxiliary perch is disposed downwardly a inwardly of the perch.

The second position of the roof extension and auxiliary perch may be defined by engagement of the auxiliary perch with the perch. When it is desired to provide a bird feeder of the type having oppositely facing access openings allowing access to a common feed reservoir, the roof of the feeder may have an inverted V-shaped configuration and a pair of roof extension/auxiliary perch units may be hingedly attached to the opposite lower marginal edges of the roof, so as to arrange a unit in overlying relationship with each of the access openings.

DRAWINGS

The nature and mode of operation of the present invention will now be more fully described in the following detailed description taken with the accompanying drawings wherein:

FIG. 1 is a top perspective view of a bird feeder formed in accordance with the present invention; and FIG. 2 is a fragmentary sectional view taken generally along the line 2—2 in FIG. 1.

DETAILED DESCRIPTION

Figure 1:
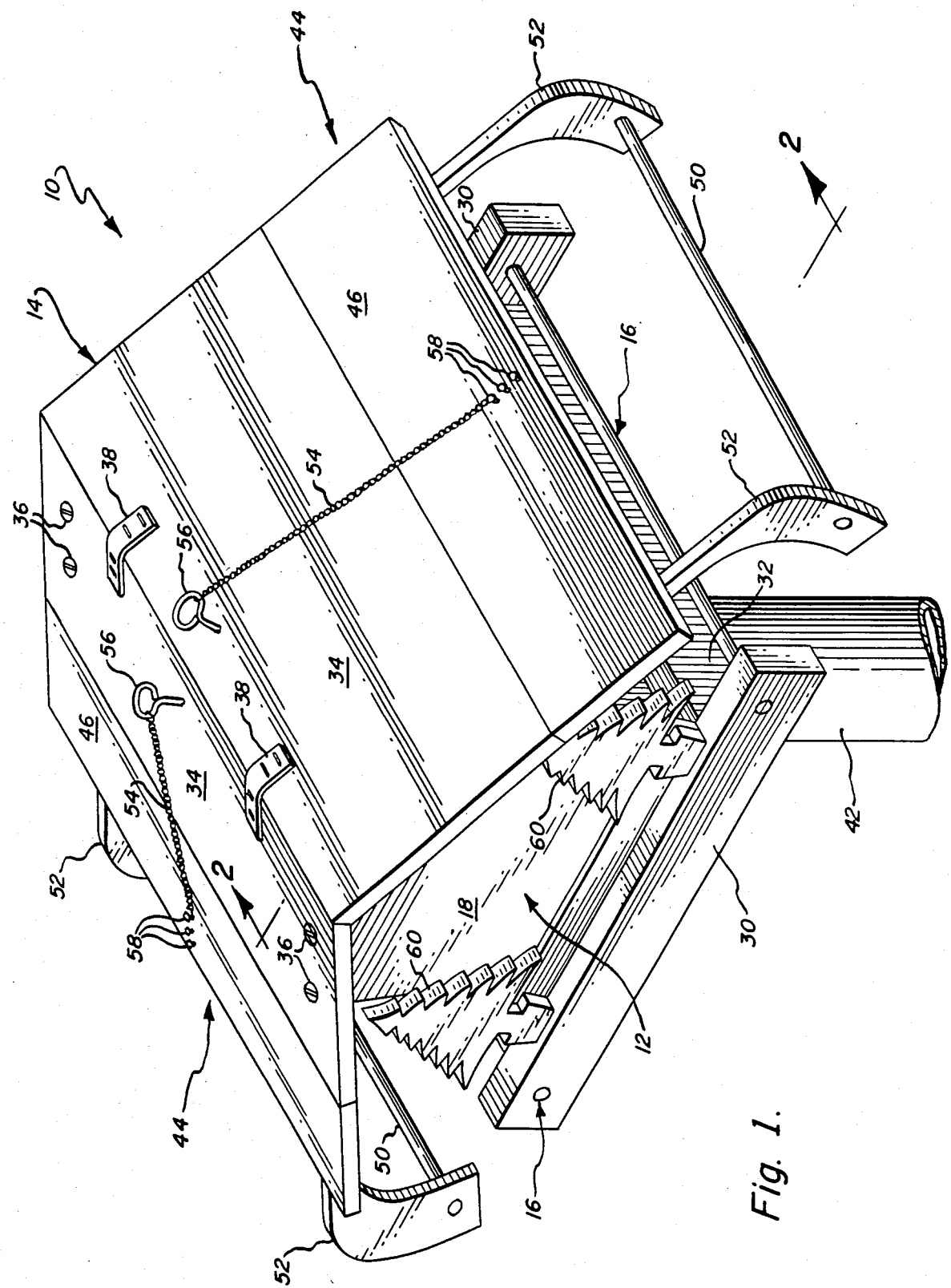

A bird feeder formed in accordance with the present invention is designated generally as 10 in FIGS. 1 and 2. Bird feeder 10 is shown as being of conventional construction from the standpoint that it generally comprises a bird feed reservoir or storage compartment 12; a roof 14 for covering the feed reservoir; and bird perches 16. Reservoir 12 may be defined by a pair of side walls 18, which are fixed to upstand from opposite side edges of a bottom wall 20; a pair of downwardly convergent, transparent end panels 22 arranged to extend between the side walls; and an interior distribution member 24, which serves to direct feed downwardly and outwardly through restricted feed access openings 26 bounded by way of example by the lower edges of end panels 22, facing surfaces of side walls 18 and the upper surface of bottom wall 20. Bird feed flowing under the influence of gravity outwardly through openings 26 may be collected in feed wells 28 defined for instance by the upper surface of bottom wall 20, a pair of side members 30 fixed to exterior surfaces of side walls 18 and a bridging member 32 extending transversely between the side members. The outer ends of side members 30 may be employed to support perches 16, which may be defined by wooden dowels, and arranged immediately adjacent feed wells 28, as best shown in FIG. 2.

Roof 14 is shown having an inverted V-shaped construction defined by a pair of downwardly divergent roof panels 34, which are preferably sized such that their free outer edge portions overlie and afford a covering for feed wells 28. Preferably, one of roof panels 34, such as the left hand panel viewed in FIG. 2, would be rigidly fixed to side walls 18, as by screw devices 36, and the other of such panels connected to the former by flexible strap type hinge devices 38 in order to provide access to feed reservoir 12 for filling/cleaning purposes. Alternatively, roof panels 34 may be rigidly interconnected to each other in which case the whole of the roof would be permitted to be lifted off of side walls 18 in order to gain access to the feed reservoir.

Feeder 10 may be suitably supported, such as by fitting bottom wall 20 with a coupling 40 for receiving the upper end of a support post or pipe 42.

Again referring to FIGS. 1 and 2, it will be understood that in accordance with the present invention, bird feeder 10 is provided with a pair of weight responsive units 44, which are intended to prevent or discourage access to feed within feed wells 28 and/or through access openings 26 by animals or birds exceeding some desired weight limit. Each unit 44 includes a roof extension 46 having its inner edge portion attached to the outer edge portion of an associated roof panel 34 by flexible strap hinge devices 48 in order to permit downwardly and inwardly directed swinging movements of the roof extension between first or normal and second or access blocking positions shown in full and broken line, respectively, for the case of the right hand roof extension viewed in FIG. 2. Each roof extension 46 serves to mount an auxiliary perch defined by a dowel 50 having its opposite ends fixed to a pair of parallel, generally L-shaped brackets 52, which have first ends suitably attached to the lower surface of its associated roof extension and second ends arranged to project outwardly and downwardly relative to an outer marginal edge portion thereof.

In FIG. 2, brackets 52 are shown as being arranged relative to their associated roof extension 46, such that dowel 50 is disposed essentially parallel to and spaced horizontally, outwardly of its associated perch 16, when unit 44 is in its first position, and below and inwardly of such perch, when the unit is in its second position. The second position of unit 44 may be defined by engagement of the lower edges of brackets 52 with the opposite ends of perch 16, as best shown in broken line in FIG. 2. Preferably, when units 44 are in their first positions, roof extensions 46 are disposed essentially coplanar with their associated roof panels 34, such that the line or contour of each side of roof 14 appears unbroken.

Suitable resilient means, such as that defined by coil type tension springs 54, having their opposite ends connected to roof panels 34 by screw eyes 56 and to roof extensions 46 by nails 58, serve to normally maintain the units in their first position. As indicated in the drawings, adjustment of the bias afforded by springs 54 may be effected by removably connecting the outer ends of the springs to selected ones of a plurality of nails 58. If desired, springs 54 may be replaced by any suitable resiliently deformable bias, such as may, for instance, be provided by leaf springs or by spring type hinges employed in place of flexible straps 48. However, it is preferable to employ springs 54 of the type shown, since same allow for adjustment thereof without disassembly or inversion of the units 44 for adjustment access purposes.

Further, in accordance with the practice of the present invention, it is preferable to attach stationary barriers 60 to feeder 10 adjacent the ends of feed wells 28 and perches 16, so as to block or hinder access thereto from the sides of the feeder. Barriers 60 may be suitably defined, such as by decorative panels resembling trees in the manner shown in the drawings. Barriers 60 would preferably be sized such that they essentially bridge between side walls 18 and roof extensions 46, when the latter are in their second position. It is also preferable to fit each bridging member 32 with a plurality of upstanding pin barriers, which are relatively closely spaced, so as to both discourage small birds from hopping into feed wells 28 and, if desired, limit the head size of the birds which may gain feeding access to the feed wells.

In operation, the tension in springs 54 is first adjusted so as to just counterbalance the weight of units 44, plus a desired weight corresponding to that of the largest bird to be permitted to use the bird feeder, when such bird is perched on dowel 50 of the auxiliary perch. Thereafter, whenever a large bird having a weight greater than the desired weight alights on one of the auxiliary perches, the counterbalancing forces provided by its associated spring 54 will be overcome and the effected unit 44 will pivot downwardly towards its second position; this movement serving to startle the large bird and cause same to leave the auxiliary perch and fly away. Downward pivotal movement of units 44 will also occur if an animal, such as a squirrel, or a large bird alights on one of roof extensions 46. In either case, the animal or large bird is discouraged from using the bird feeder, and movement of roof extension 46 into its second position effectively blocks access to feed well 28 even for the situation where a squirrel places only the front part of its body on the roof extension. It will be understood that side barriers 60 require animals and birds to approach feed wells 28 from the front of units 44, as viewed from the left and right in FIG. 2, and that the extent of overhang of roof extensions 46 forces even relatively small birds, for which the feeder is intended, to alight on the auxiliary perches before attempting to approach the feed wells. Thus, the provision of units 44 serves to effectively limit access to bird feeder 10 by birds equal to or less than a desired weight for which springs 54 are initially adjusted. The mode of mounting units 44 on roof 14 does not interfere with or require any dismantling of the units relative to the roof when it is desired to add feed to or clean reservoir 12.

While a preferred form of the invention has been specifically illustrated and described, it will be apparent that departures therefrom may be made without departing from the spirit of the invention. In this respect, it is contemplated, as by way of example, that a bird feeder may be fitted with only one of the weight responsive units where such feeder is intended to be provided with only one access opening.

I claim:

1. A bird feeder comprising in combination:
   a feed reservoir provided with at least one feed access opening;
   a perch arranged adjacent said access opening;
   a roof for covering said reservoir; and
   a weight responsive unit for preventing access to feed available at said access opening by animals and birds above a desired weight, said unit including a roof extension hingedly attached to said roof adjacent an edge thereof arranged above said access opening, an auxiliary perch depending from said roof extension and spring means for biasing said roof extension and said auxiliary perch to normally assume a first position, wherein said roof extension is generally aligned with an adjacent portion of said roof to which same is attached and said auxiliary perch is disposed parallel to and spaced horizontally outwardly of said perch, said roof extension and said auxiliary perch being movable against said bias to a feed access opening blocking position upon the application of a weight to said auxiliary perch exceeding said desired weight, wherein said roof extension covers said access opening and said auxiliary perch is disposed downwardly and inwardly of said perch.

2. A bird feeder, according to claim 1, wherein said blocking position is defined by engagement of said auxiliary perch with said perch.

3. A bird feeder according to claim 1, wherein said reservoir has a pair of oppositely facing access openings, said roof is of inverted V-shaped configuration and defined by a pair of downwardly divergent roof panels and one said unit is hingedly connected to each of said panels.

4. A bird feeder according to claim 3, wherein said bird feeder includes stationary barrier means limiting access to said access openings to a direction from in front of said units facing towards said access openings.

5. A bird feeder according to claim 1, wherein said spring means includes a tension spring having its opposite ends connected to said roof and said roof extension, and means are provided to adjustably attach at least one of said ends for selectively controlling the bias of said spring.

6. A bird feeder comprising in combination:
a feed reservoir provided with a pair of oppositely facing feed access openings;
a pair of stationary perches arranged one perch of said pair of perches adjacent each of said access openings and extending generally parallel thereto;
a roof of inverted V-shaped configuration defined by a pair of downwardly divergent roof panels each having an opposite edge portion thereof overlying one of said access openings and one of said perches arranged adjacent thereto; and
a pair of weight responsive units arranged one unit of said pair of units for selectively preventing access to feed available adjacent one of said access openings, each of said units including a roof extension hingedly attached to one of said roof panels adjacent said opposite edge portions thereof, an auxiliary perch defined by a pair of generally L-shaped brackets having first ends attached to said roof extension and second ends extending outwardly and downwardly of an outer marginal edge portion thereof and a dowel extending between said second ends and arranged parallel to said one of said perches, and spring means for biasing said roof extension and auxiliary perch to normally assume a first position, wherein said roof extension is generally coplanar with said one of said roof panels and said dowel is arranged in a spaced relationship and horizontally outwardly of said one of said perches, said roof extension and said auxiliary perch being movable to a second position against the bias of said spring means by a weight exceeding a desired weight applied to said dowel, wherein said roof extension is disposed in front of said one of said access openings and said dowel is disposed below and inwardly of said one of said perches, and said second position is defined by engagement of said brackets with said one of said perches.

7. A bird feeder according to claim 6, wherein said spring means includes a tension spring having opposite ends thereof connected to said roof extension and said one of said roof panels and means to adjust the tension of said tension spring.

* * * * *